US 6,690,507 B2

(12) United States Patent
Gray et al.

(10) Patent No.: US 6,690,507 B2
(45) Date of Patent: Feb. 10, 2004

(54) DOUBLE-PUMPED RAMAN AMPLIFIER

(75) Inventors: Stuart Gray, Corning, NY (US);
Stephen C Guy, Bayview (AU); James R Passalugo, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/062,903

(22) Filed: Jan. 30, 2002

(65) Prior Publication Data
US 2003/0142389 A1 Jul. 31, 2003

(51) Int. Cl.[7] ............... H01S 3/30; H01S 3/06
(52) U.S. Cl. ............ 359/341.32; 359/334; 359/341.33; 372/3; 372/71
(58) Field of Search ................. 359/134, 160, 359/334, 341.3, 341.32, 341.33; 372/3, 70, 71

(56) References Cited

U.S. PATENT DOCUMENTS

| | | |
|---|---|---|
| 4,528,671 A | 7/1985 | Robbins |
| 4,637,025 A | 1/1987 | Snitzer et al. |
| 4,674,830 A | 6/1987 | Shaw et al. |
| 4,782,491 A | 11/1988 | Snitzer |
| 4,839,898 A | 6/1989 | Payne et al. |
| 4,859,016 A | 8/1989 | Shaw et al. |
| 4,910,737 A | 3/1990 | Payne et al. |
| 4,938,556 A | 7/1990 | Digonnet et al. |
| 4,963,832 A | 10/1990 | Desurvire et al. |
| 4,964,131 A | 10/1990 | Liu et al. |
| 5,048,026 A | 9/1991 | Shaw et al. |
| 5,136,420 A | 8/1992 | Inagaki et al. |
| 5,138,483 A * | 8/1992 | Grasso et al. ............... 359/341 |
| 5,673,280 A * | 9/1997 | Grubb et al. ................. 372/3 |
| 5,887,093 A * | 3/1999 | Hansen et al. ............... 385/27 |
| 5,991,070 A * | 11/1999 | Zanoni et al. ............... 359/341 |
| 6,417,961 B1 * | 7/2002 | Sun et al. ................. 359/337.5 |
| 6,510,000 B1 * | 1/2003 | Onaka et al. ............... 359/334 |
| 2002/0067537 A1 * | 6/2002 | Islam ........................ 359/337 |
| 2002/0109909 A1 * | 8/2002 | Kinoshita ................. 359/341.1 |
| 2003/0016437 A1 * | 1/2003 | Islam ........................ 359/334 |

FOREIGN PATENT DOCUMENTS

| | | | |
|---|---|---|---|
| AU | B- 36253 | | 6/1985 |
| EP | 0 143 561 | | 6/1985 |
| EP | 734105 | * | 9/1996 |
| JP | 58-115948 | | 7/1983 |
| JP | 2-221937 | | 9/1990 |
| JP | 2-306677 | | 12/1990 |
| JP | 3-92828 | | 4/1991 |
| JP | 03-214681 | * | 9/1991 |
| JP | 3247456 | * | 9/1991 |
| JP | 65145161 | * | 11/1993 |
| JP | 6283790 A | * | 10/1994 |
| WO | PCT/WO 87/04881 | | 8/1987 |

OTHER PUBLICATIONS

Grubb et al, Laser Focus World, 2/96, pp. 127–130, 131, and 134, Feb. 1996.*

(List continued on next page.)

Primary Examiner—Nelson Moskowitz
(74) Attorney, Agent, or Firm—Svetlana Z. Short

(57) ABSTRACT

A double pumped Raman amplifier is provided that increases gain over a same length of gain fiber without significantly increasing a percentage of noise. The amplifier may include a source of pump light coupled to the output end of a coil of Raman gain fiber, and a reflector coupled to the input end of the coil which may be either a mirror, or a fiber Bragg grating. Alternatively, a beam splitter may be connected to the source of pump light and the resulting split output may be coupled to both the input and output ends of the gain fiber. The increase in amplification efficiency allows the optical fiber used in components such as dispersion compensating modules to also be used as Raman gain fiber in such amplifiers.

7 Claims, 5 Drawing Sheets

OTHER PUBLICATIONS

Lauridser et al., Electronics Letters, Feb. 14, 1991, No. 4, pp. 327–329.*

Grubb et al., OFC '96, Tech Digest, pp. 30–31.*

P.C. Becker et al., High–Gain and High Efficiency Diode Laser Pumped Fiber Amplifier at 1.56 μm, *IEEE Photonics Technology Letters*, Sep. 1, 1989, No. 9, New York, US.

R.I. Laming et al., "Optimal Pumping of Erbium–Doped–Fibre Optical Amplifiers," *ECOC*, pp. 25–27, Sep., 1988.

"Single–Mode Fibre Optic Components," FIFAM Ltd., Devon, England.

W.L. Barnes et al., "High–Optical–Efficiency $Er^3$ Fiber Lasers Pumped at 980 nm," *1989 Optical Society of America*, pp. 1002–1004.

* cited by examiner

DOUBLE-PUMPED RAMAN AMPLIFIER

FIELD OF THE INVENTION

This invention generally relates to optical amplifiers, and is specifically concerned with a double-pumped Raman amplifier that provides a greater amount of gain per unit length of gain fiber.

BACKGROUND OF THE INVENTION

Optical amplifiers are well known in the prior art. Such amplifiers are used in optical communication networks both as relay stations for single, long-distance optical circuits, and for boosting signal strength in shorter-distance optical circuits of the type installed around an urban area.

There are generally two types of optical amplifiers, including erbium-doped fiber amplifiers (EDFAs) and Raman-type amplifiers. While both types utilize a pump laser coupled to a gain fiber, the operation of each is quite different. In EDFAs, the gain fiber is doped with erbium or some other rare-earth metal with similar properties. Amplification is accomplished by the excitation of the dopant atoms in the fiber to a high quantum level by the pump laser. An optical signal conducted through such a gain fiber will cause the excited atoms to fall back to a lower quantum level which in turn amplifies the signal through constructive interference. By contrast, Raman-type optical amplifiers utilize conventional transmission optical fiber (i.e., conventional germanium-doped fiber) as the gain fiber. Light from a laser pump is transmitted through such a fiber in the opposite direction as the optical signal being conducted therethrough. The forward-propagating signals achieve gain in the fiber because higher-energy (shorter wavelength) pump photons scatter off the vibrational modes of the optical fiber's lattice matrix and coherently add to the lower-energy (longer wavelength) signal photons. While it is possible to achieve amplification by pumping a Raman amplifier in the same direction as the input signal, backward pumping is greatly preferred over forward pumping due to the fact that pump noise is present at a much higher level in the output signal when the pumping is conducted in a forward direction. The maximum gain levels that can be achieved with such Raman amplifiers are typically less than those achievable by EDFAs. However, because Raman amplifiers require no specially doped optical fiber and often include fewer components than EDFAs, Raman amplifiers are often more economical than EDFAs and are often preferred over them.

Because the Raman scattering process in typical transmission fibers is relatively inefficient, several kilometers of fiber are required to achieve high gains at reasonable pump efficiencies. Unfortunately, the use of long fiber lengths on the order of 5 kilometers or more creates several problems that compromise the overall performance of such amplifiers. For example, a type of noise as multi-path interference (MPI) increases when such long lengths of fiber are used as the gain fiber. MPI is caused by double Rayleigh back scattering wherein a fraction of the signal which gets Rayleigh scattered within the fiber is captured by the fiber and propagates in a direction opposite to that of the signal. This scattered light is amplified as it propagates and also undergoes further Rayleigh scattering. Some of the doubly scattered light is captured by the fiber and now co-propagates with the signal causing interference at the receiver. Since the scattered light has been passed through the amplifier twice, it sees twice the gain of the signal. Accordingly, cross talk from double Rayleigh back scattering increases rapidly with increasing gain. Another such problem is that of nonlinear interactions within the amplifier. Such a problem manifests itself in other species of noise known as four wave mixing and self and cross-phase modulation. Such problems increase with not only a long length of gain fiber, but with fiber characteristics which promote Raman amplification within the fiber, such as an increased percentage of germanium dopant, and a small mode-field diameter on the order of 4–5 micrometers.

Hence, there is a need for an improved type of Raman optical amplifier that is capable of achieving higher levels of signal gain with smaller lengths of gain fiber with a same or larger signal to noise ratio. Such an improved Raman amplifier would not only solve the aforementioned noise problems that result from the use of long lengths of gain fiber, but would also make it possible for other optical network components, such as dispersion compensating modules (DCMs) to provide the gain fiber necessary for a high-gain Raman-type amplifier. While DCMs typically include a loop of the type of high germanium, small-mode field diameter fiber that exhibits high degrees of Raman amplification, the fiber loops within such DCMs is only about 3 kilometers, which is less than that typically needed for effective Raman amplification. Accordingly, if a way could be found to achieve a high degree of Raman amplification with only 3 kilometers of gain fiber and no additional noise, such DCMs could be effectively employed not only as dispersion reducing components, but as amplification components as well.

SUMMARY OF THE INVENTION

The invention is a Raman optical amplifier that overcomes or at least ameliorates all of the aforementioned shortcomings. To this end, the amplifier of the invention comprises a length of optic Raman gain fiber, and a source of pump light coupled at opposite ends of the fiber for transmitting pump light in opposite directions as an optical signal is conducted through the fiber, thereby providing a double-pass of pump light. The source of pump light may include a single pump light source that is coupled at a downstream end of the gain fiber to transmit pump light in a direction opposite to the optical signal, and a reflector coupled to an opposite end of the gain fiber for reflecting remnant pump light back through the gain fiber in the same direction as the optical signal. Alternatively, the light reflector may be either a mirror coupled to the input end of the gain fiber via a wave division multiplexer, or a fiber Bragg grating written directly into the input end of the fiber. Both the mirror and the fiber Bragg grating may be adjustable to change either the mirror angle or the grating length in order to provide a gain control mechanism for the amplifier. In the case of the fiber Bragg grating, such length adjustment may be accomplished through the use of piezoelectric transducers.

In an alternative embodiment, pump light may simultaneously be provided on both the input and output ends of the gain fiber via a pair of optical pumps, or a single pump in combination with a beam splitter.

In another embodiment of the invention, a bi-directional pumping scheme may be used in combination with a pair of serially connected coils of gain fiber. In such a configuration, a pump light reflector in the form of either a fiber Bragg grating or a pair of mirrors may be optically coupled between the two coils of gain fiber to reflect both the forward and backward propagating pump light for an extra measure of amplification efficiency.

According to an embodiment of the present invention, in order to suppress multiple path interference (MPI) type noise in such a configuration, an optical isolator may be provided between the two mirrors or between two fiber Bragg gratings coupled between the coils of gain fiber. Additionally, other mid-stage components such as gain flattening filters or variable optical attenuators may be coupled between the two gain fiber coils in order to reduce the amount of tilt and ripple in the amplifier output.

In still another embodiment of the invention, a single pump may be coupled to the output end of the amplifier, and a remnant pump loop may be coupled between the two coils. In this embodiment remnant pump light is used to power Raman amplification in the coil nearest the input end of the amplifier.

By providing better absorption of pump light, the optical amplifier of the present invention provides higher levels of gain for shorter lengths of gain fiber. Consequently, the invention advantageously allows the coil of fiber used within dispersion compensating modules to effectively serve the additional function of gain fiber for a Raman amplifier. Also, because only part of the gain is provided by pump light propagating in the same direction as the signal, the requirements for a very low noise pump source are relaxed compared to the case of an amplifier using only forward pumping.

DETAILED DESCRIPTION OF THE PREFERRED EMBODIMENTS

Figure 1:
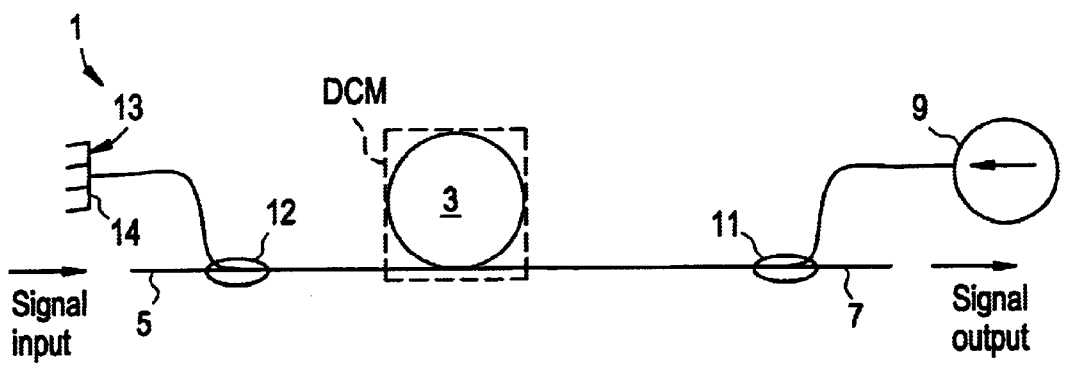
FIG. 1 is a schematic diagram of a first embodiment of the Raman amplifier of the invention, wherein the source of pump light comes from a laser pump connected to the output end of the amplifier, and a reflector coupled to the input end that reflects pump light back to the gain fibers.

With reference to FIG. 1, wherein like numerals designate like components throughout all of the several Figures, the first embodiment 1 of the double-pumped Raman amplifier of the invention comprises a coil of gain fiber 3 having an input end 5 and an output end 7. A laser pump 9 is coupled to the output end of the coil 3 via a wave division multiplexer 11. At the input end of the fiber 3, a wave division multiplexer 13 couples a pump reflector 13 to the input end 5 as shown. In the preferred embodiment, pump reflector 13 may be either an ordinary optical mirror, or a Faraday mirror. Additionally, the mirror 14 might be movable to reflect more or less of the remnant pump light back into the gain fiber 3 in order to provide a gain controller for the amplifier 1. Because the amplifier 1 generates higher gain levels for shorter gain fiber lengths, the coil of gain fiber 3 in this first embodiment (as well as all other embodiments illustrated in FIGS. 2–8) may advantageously be the coil of fiber used within a dispersion compensating module, indicated in phantom, as the fiber used in such modules is characterized by a high level of germanium dopant and a small mode field diameter on the order of 4 to 5 micrometers. Serendipitously, such dispersion compensating modules used for C-band transmissions have approximately 3 kilometers of fiber, which is about optimal for the maximum performance of the amplifier 1 of the invention. In operation, pump light from the laser pump 9 enters the output end of the coil of gain fiber 3 in an opposite direction to a signal input, thereby amplifying the input via standard Raman amplification. Unabsorbed pump light is routed to the reflector 13 via wave division multiplexer 12, and is reflected back along the gain fiber 3 in the same direction as the transmission of the signal input, thus providing an additional stage of amplification for the signal. The provision of a second pass of the pump light through the fiber 3 provides substantial additional amplification to the signal as is plainly evident in FIG. 9.

Figure 2:
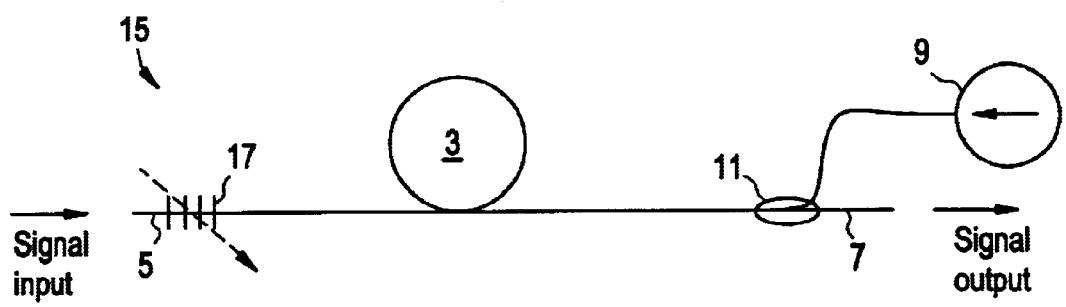
FIG. 2 is a second embodiment of the Raman amplifier of the invention, wherein a fiber Bragg grating is used in lieu of the aforementioned pump reflector at the input end.

FIG. 2 illustrates a second embodiment 15 of the double-pass Raman amplifier of the invention. Here, the wave division multiplexer 12 and pump reflector 13 have been replaced with a fiber Bragg grating 17 which is preferably written directly into the input end 5 of the coil of gain fiber 3. The fiber Bragg grating 17 performs the same function in reflecting back remnant pump light from the signal input back to the Raman gain fiber 3. However, because this component is written directly into the input end 5 of the fiber 3, there are no splice or component losses as there would be with the use of a wave division multiplexer. This is a significant advantage, as such splice and component losses are often on the order of 2 dB, and are doubled in the first embodiment 1 as a result of the remnant light entering and then reflecting back out of the wave division multiplexer 12. As was the case with the first embodiment 1, the Raman gain fiber 3 may be the same fiber used within a dispersion compensating module. Additionally, as is indicated in phantom, the fiber Bragg grating 17 may be an adjustable grating whose length and hence maximum reflectivity characteristics may be changed with respect to wavelength in order to provide a gain controller for the embodiment 2. Such adjustable fiber Bragg gratings are known in the prior art, and are typically rendered adjustable by the provision of a piezoelectric crystal which, when actuated, operates to stretch the grating in order to change is reflectivity characteristics.

Figure 3:
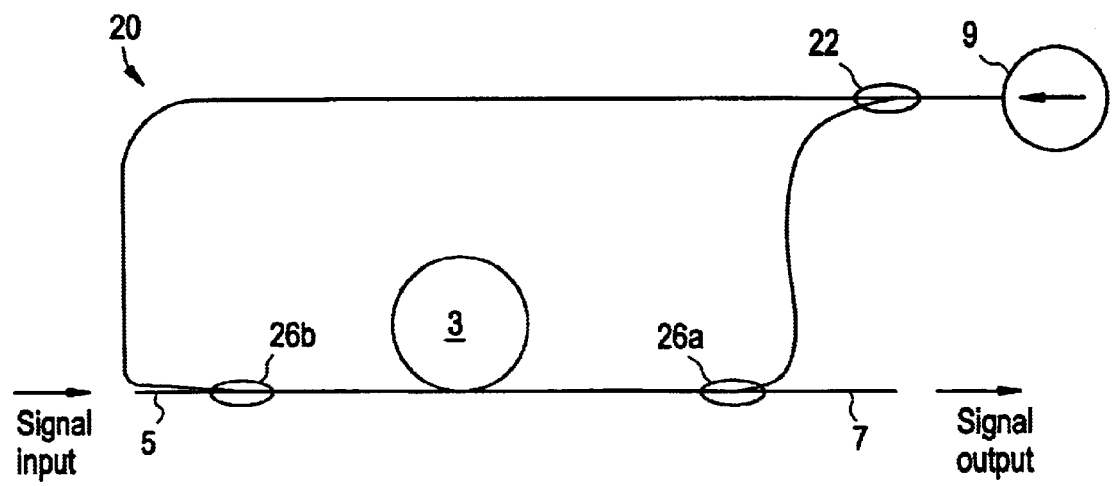
FIG. 3 is a schematic view of a third embodiment of the invention wherein the source of pump light is a single laser pump in combination with an optical splitter that transmits pump light to both the input and output ends of the gain fiber.

FIG. 3 illustrates a third embodiment 20 of the Raman amplifier of the invention wherein the pump light reflector has been replaced by the combination of laser pump 9 and beam splitter 22. Beam splitter 22 operates to split the output of the laser pump and simultaneously transmits the split beams in opposite directions through the coil of Raman gain fiber 3 at both the input and output ends 5, 7, respectively, via wave division multiplexers 26b and 26a. The beam splitter 22 does not necessarily split the beam on a 50—50 basis. Preferably, a larger percentage of the pump light is transmitted down the output end 7 of the fiber 3, via wave division multiplexer 26 than through the input end 5 of the fiber 3 via wave division multiplexer 26b. Such an uneven splitting of the pump light reduces the amount of pump noise superimposed over the amplified signal at the output end 7. For example, the splitter 22 might transmit 65% of the pump light to the output end 7 and only 35% of the pump light to the input end 5 of the gain fiber 3. Of course, a pair of separate laser pumps may be used in this design. However, the use of a single laser pump 9 in combination with a beam splitter is generally preferred due to lower costs.

Figure 4:
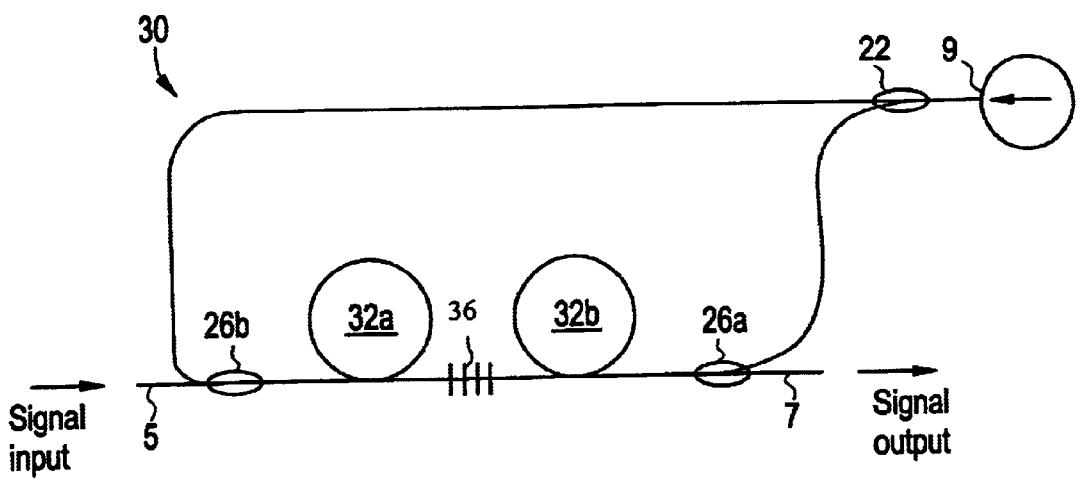
FIG. 4 is a fourth embodiment of the invention which utilizes a combination of a laser pump and beam splitter as previously described in combination with a pair of serially connected loops of gain fiber with a fiber Bragg grating disposed therebetween.

FIG. 4 illustrates a fourth embodiment 30 which is similar in structure and operation to the third embodiment 20 with the exception that the gain fiber is split into two serially connected coils 32a, b. Additionally, a fiber Bragg grating 36 is written in the fiber that constitutes the serially connection between the coils 32a, b. In this embodiment 30, the fiber Bragg grating 36 reflects remnant light from both ends of beam splitter 22 back through the Raman gain fiber, thereby further increasing the absorption of pump light in the fiber 32a, b.

Figure 5:
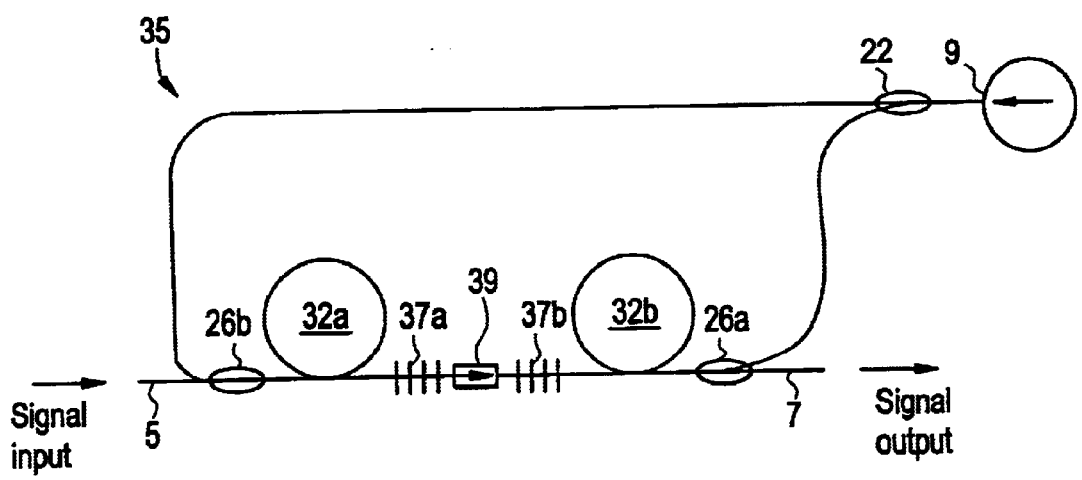
FIG. 5 is a fifth embodiment of the invention which is the same as that described with respect to FIG. 4 with the exception that an optical isolator is disposed between a pair of Bragg gratings optically connected between the two serially connected coils of gain fiber.

FIG. 5 illustrates a fifth embodiment 35 of the invention which is the same in structure and operation as the fourth embodiment, with the exception that the fiber Bragg grating 36 has been replaced with a pair of serially connected fiber Bragg gratings 37a, b with an optical isolator 39 disposed therebetween. The provision of an optical isolator 39 suppresses noise which otherwise might occur as a result of multiple path interference.

Figure 6:
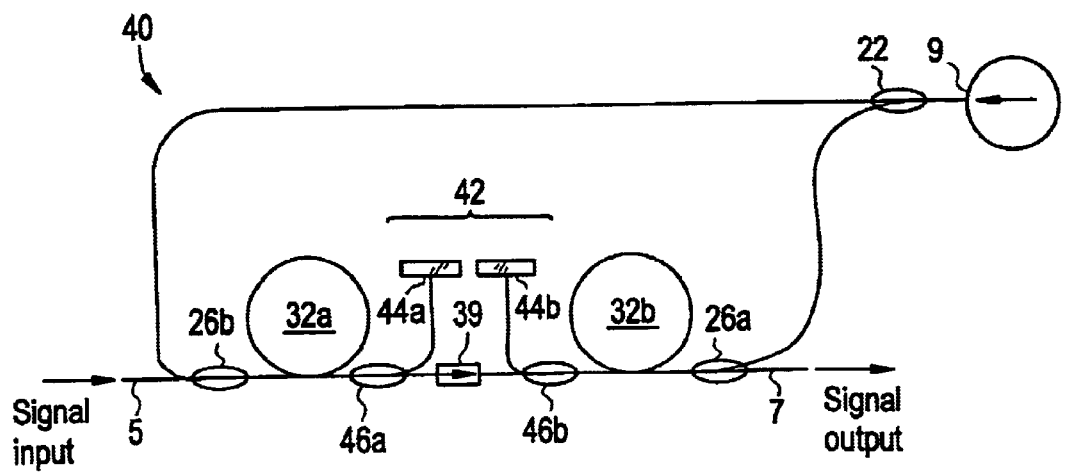
FIG. 6 is a sixth embodiment of the invention wherein mirrors are used in lieu of the pair of fiber Bragg gratings illustrated in FIG. 5.

FIG. 6 illustrates a sixth embodiment 40 of the invention, wherein the serially connected fiber Bragg gratings 37a, b have been replaced with a pair of mirrors 44a, b coupled between the gain fiber coils 32a, b via wave division multiplexers 46a, b. As was the case with respect to the fifth embodiment, an optical isolator 39 is coupled between the wave division multiplexers 46a, b which guide pump light and remnant light into and out of the mirrors 44a, b of the reflector 42. While this sixth embodiment 40 is simpler in structure than the fifth embodiment 35, it has the disadvantage of the splice losses caused by the wave division multiplexers 46a, b.

Figure 7:
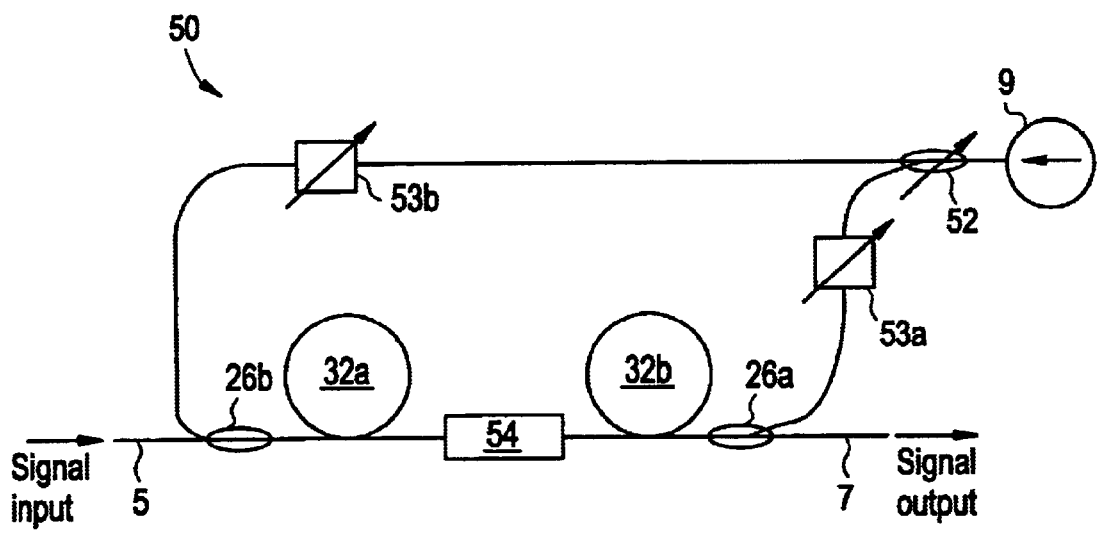
FIG. 7 is a seventh embodiment of the invention wherein the mirrors shown in FIG. 6 have been replaced with mid-stage components.

FIG. 7 illustrates a seventh embodiment 50 of the double-pass Raman amplifier of the invention which is similar in structure and operation to the sixth embodiment, with the exception that the reflector 42 and optical isolator 39 have been replaced by mid-stage components 54 which may comprise, for example, a variable optical attenuator in combination with a gain flattening filter. These components 54 in combination with the variable optical attenuators 53a, b provided in the optical fibers stemming from the variable splitter 52 allow for a broad measure of gain control in this embodiment 50 of the amplifier, along with the elimination of a substantial amount of tilt and ripple which normally accompanies the amplifier output.

Figure 8:
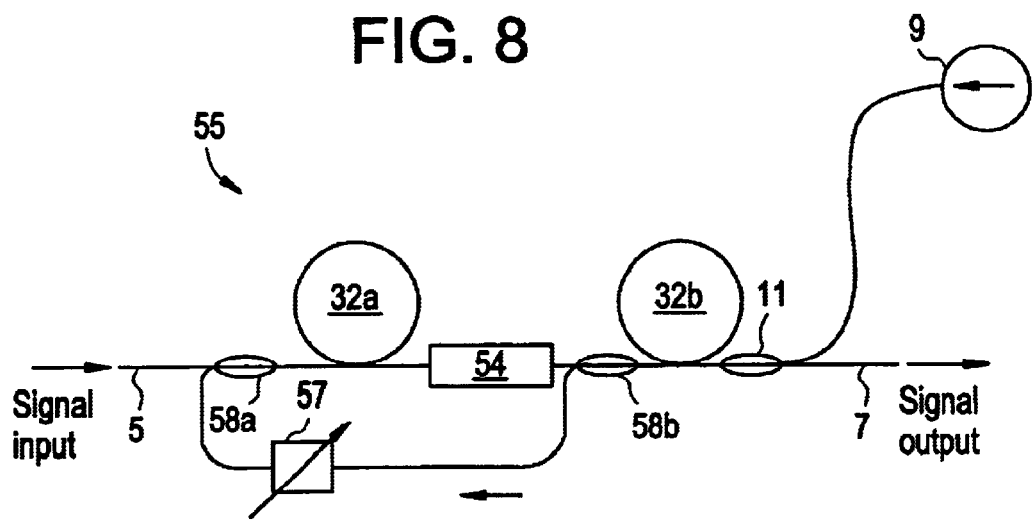
FIG. 8 is an eighth embodiment of the invention which is similar to the FIG. 7 embodiment except for the replacement of the pump and beam splitter with a pump and remnant pump circuit.

Finally, FIG. 8 illustrates an eighth embodiment 55 of the amplifier where the beam splitter 52 of the seventh embodiment has been eliminated so that the pump 9 transmits its output at the output end 7 of the two serially connected coils 32a, b. Remnant pump light is directed back upstream through the two serially connected gain fiber coils 32a, b via wave division multiplexers 58b, a, as indicated. A variable optical attenuator 57 is provided in this remnant pump loop in order to provide gain control for this embodiment 55 of the amplifier. Again, mid-stage components 54 are provided between the two serially connected coils 32a, b to flatten the signal output.

Figure 9:
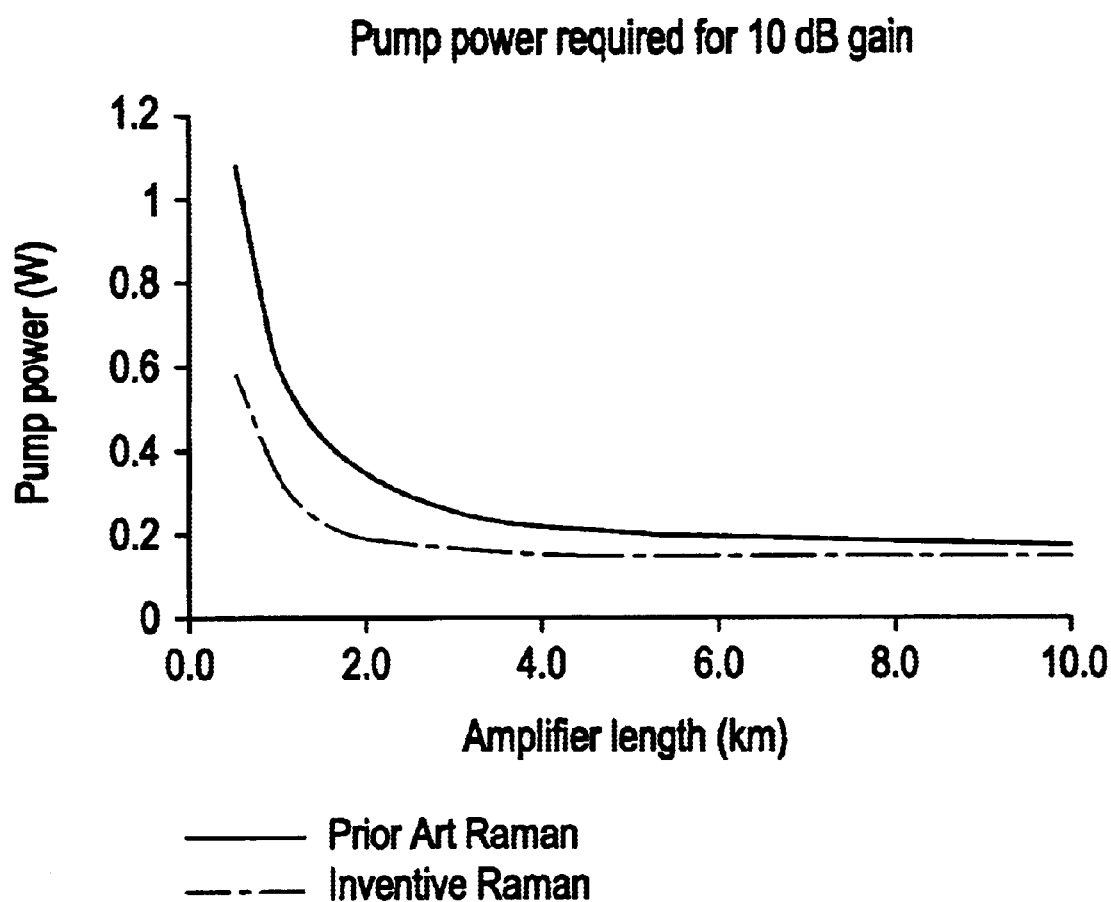
FIG. 9 is a graph illustrating the relationship between gain fiber length and the pump power, in watts, required for 10 dB gain for a standard Raman amplifier versus the double-pumped Raman amplifier of the invention.

FIG. 9 generally illustrates the advantages associated with all the aforementioned embodiments of the double-pass Raman amplifier of the invention. Specifically, for a 10 dB gain and a gain fiber length of 2 kilometers, the required amount of pump power is reduced from 0.38 watts to 0.20 watts which constitutes almost a 50% decrease in the power needed for the same gain for the same length of gain fiber.

Figure 10:
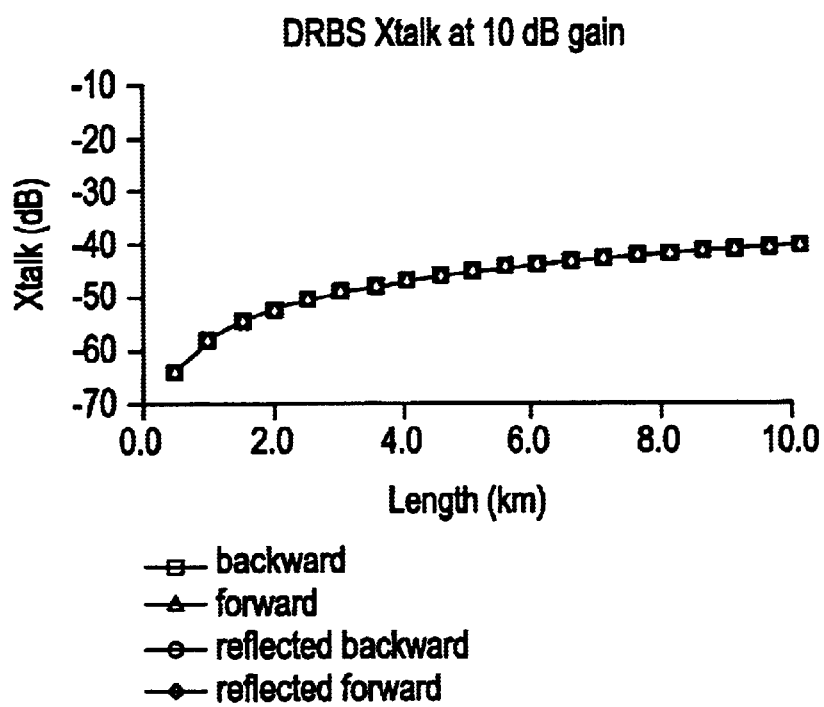
FIG. 10 is a graph illustrating cross-talk noise at 10 dB gain for both prior art and the double-pumped Raman amplifier of the invention.
Figure 11:
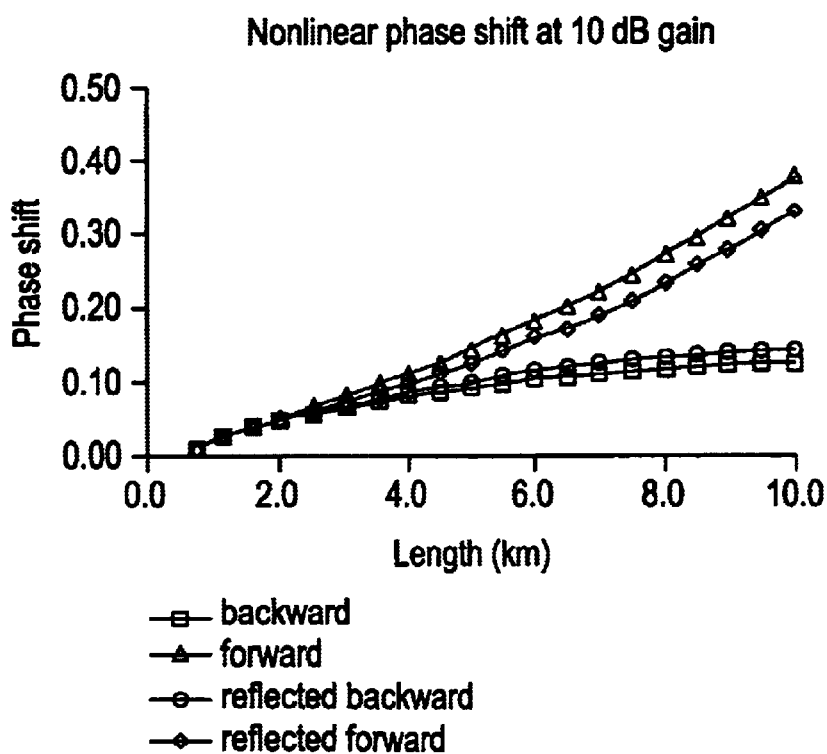
FIG. 11 is a graph illustrating phase shift noise at 10 dB of gain for both a prior art Raman amplifier and the double-pumped Raman amplifier of the invention.

FIGS. 10 and 11 illustrate that the increase in gain for fiber length associated with the invention is not significantly accompanied by additional noise. In particular, the graph of FIG. 10 illustrates that noise from cross talk at a 10 dB gain is virtually identical between prior art Raman amplifiers, and amplifiers which achieve double-pass through reflection or through a splitting of the pump light (or through the use of two or more pumps, although this would not be as economical as the use of a single pump with a beam splitter). FIG. 11 illustrates that noise due to nonlinear phase shift at a 10 dB gain is about the same for gain fiber lengths up to 4 kilometers between conventional Raman amplifiers, and amplifiers employing the double-pass reflection or beam splitter schemes of embodiments 1–8. This graph further illustrates that such phase shift noise increases with either a forward pump Raman amplifier, or an amplifier wherein a forward (i.e., toward the signal output) reflection is provided. Such noise is less in either a standard backward directed pump light, or a reflected backward pump light configuration of the invention. This graph is consistent with the characteristics of the noise superimposed over the signal from the pump itself, i.e., such noise is amplified in forward-pumped configurations, and hence is substantially greater in such designs than in backward pumped configurations.

While this invention has been described with respect to a number of different embodiments, various modifications and additions to the invention will become evident to persons of skill in the art. All such variations, modifications, and additions are intended to be encompassed within the scope of this patent, which is limited only by the claims appended hereto.

Parts List

1. First embodiment
3. Coil of gain fiber
5. Input end
7. Output end
9. Laser pump
12. Wave division multiplexer
13. Pump reflector
15. Second embodiment
17. Fiber Bragg grating
20. Third embodiment
22. Beam splitter
26. Wave division multiplexers a, b 30. Fourth embodiment
32. Coils a, b
35. Fifth embodiment
36. Bragg grating
37. Bragg grating a, b
39. Optical isolator
40. Sixth embodiment
44. Mirror a, b
46. Wave division multiplexers a, b
50. Seventh embodiment
52. Variable splitter
53. Variable optical attenuators a, b
54. Mid-stage components
55. Eighth embodiment
57. Variable optical attenuator
58. Wave division multiplexers a, b

What is claimed is:

1. A Raman optical amplifier, comprising:
   a length of optical fiber absorbing pump light and generating gain in optical signals conducted through said fiber, wherein said length of optical fiber is less than 6 kilometers;
   a source of pump light coupled to one end of a fiber; and
   an optical reflector coupled to another end of said fiber reinjecting unabsorbed pump light back into said fiber, wherein said optical reflector provides a tunable intensity of reflected light at a fixed optical wavelength to control a gain level of said amplifier.

2. A Raman optical amplifier, comprising:
   a length of optical fiber absorbing pump light and generating gain in optical signals conducted through said fiber, wherein said length of optical fiber is less than 6 kilometers;
   a source of pump light coupled to one end of a fiber; and
   an optical reflector coupled to another end of said fiber reinjecting unabsorbed pump light back into said fiber, wherein said optical reflector independently provides a tunable intensity of reflected light for each of a plurality of optical wavelengths to control a gain level of said amplifier.

3. A Raman optical amplifier, comprising:
   a length of optical fiber absorbing pump light and generating gain in optical signals conducted through said fiber, wherein said length of optical fiber is less than 6 kilometers;
   a source of pump light coupled to one end of a fiber; and
   an optical reflector coupled to another end of said fiber reinjecting unabsorbed pump light back into said fiber, wherein said optical reflector provides a tunable intensity of reflected light to control a gain level of said amplifier and wherein said optical reflector includes a variable optical attenuator for tuning said intensity of reflected light.

4. A Raman optical amplifier, comprising:
   a length of optical fiber absorbing pump light and generating gain in optical signals conducted through said fiber, wherein said length of optical fiber is less than 6 kilometers;
   a source of pump light coupled to one end of a fiber; and
   an optical reflector coupled to another end of said fiber reinjecting unabsorbed pump light back into said fiber, wherein said optical reflector provides a tunable intensity of reflected light to control a gain level of said amplifier, wherein said optical reflector includes a mirror and a mechanism for tilting said mirror for tuning said intensity of reflected light.

5. A Raman optical amplifier, comprising:
   a length of optical fiber absorbing pump light and generating gain in optical signals
   conducted through said fiber, wherein said length of optical fiber is less than 6 kilometers;
   a source of pump light coupled to one end of a fiber; and
   an optical reflector coupled to another end of said fiber reinjecting unabsorbed pump light back into said fiber, wherein said optical reflector provides a tunable intensity of reflected light to control a gain level of said amplifier, wherein said optical reflector includes a variable loss coupling for tuning said intensity of reflected light.

6. A Raman optical amplifier, comprising:
   a length of optical fiber absorbing pump light and generating gain in optical signals conducted through said fiber, wherein said length of optical fiber is less than 6 kilometers;
   a source of pump light coupled to one end of a fiber; and
   an optical reflector coupled to another end of said fiber reinjecting unabsorbed pump light back into said fiber, wherein said optical reflector provides a tunable intensity of reflected light to control a gain level of said amplifier, wherein the optical reflector includes a tunable fiber Bragg grating for providing said tunable intensity of reflected light.

7. A Raman optical amplifier, comprising:
   a length of optical fiber absorbing pump light and generating gain in optical signals conducted through said fiber, wherein said length of optical fiber is less than 6 kilometers;
   a source of pump light coupled to one end of a fiber; and
   an optical reflector coupled to another end of said fiber reinjecting unabsorbed pump light back into said fiber, wherein said optical reflector provides a tunable intensity of reflected light to control a gain level of said amplifier, said Raman optical amplifier further comprising a plurality of light pumps for providing pump light at different wavelengths, and a plurality of optical reflectors for independently providing a tunable intensity of reflected light for each light pump.

* * * * *